March 8, 1960  E. A. LINK  2,927,366
METHOD OF MAKING MAGNETIC CORES
Filed May 21, 1956  2 Sheets-Sheet 1
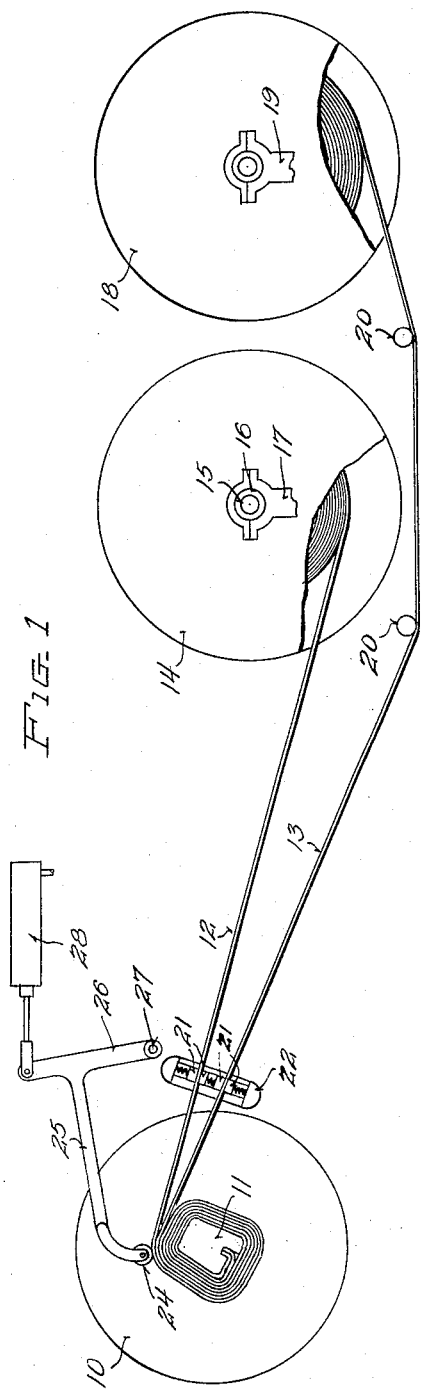
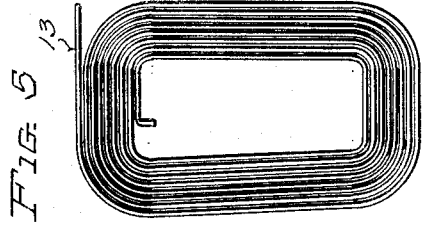
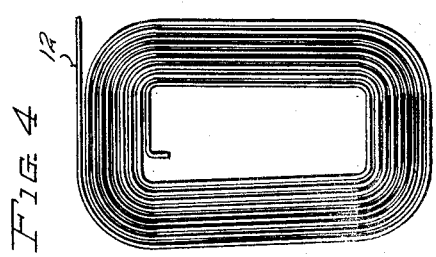
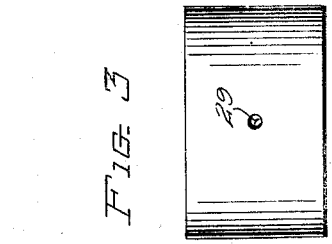
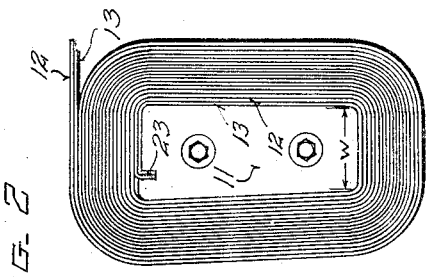
INVENTOR.
Edwin A. Link
BY
Attorney March 8, 1960     E. A. LINK     2,927,366
METHOD OF MAKING MAGNETIC CORES
Filed May 21, 1956     2 Sheets-Sheet 2
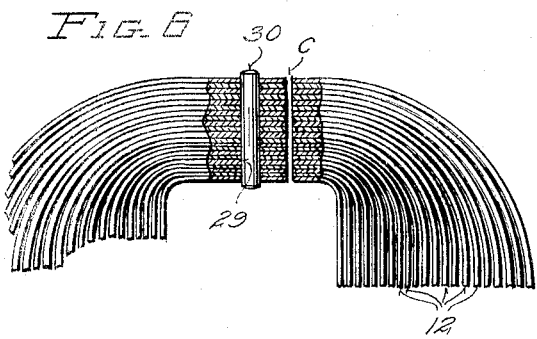
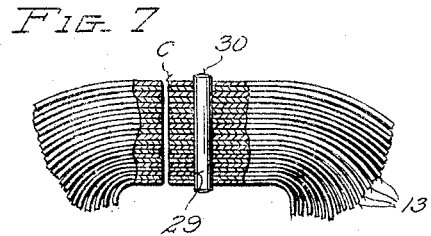
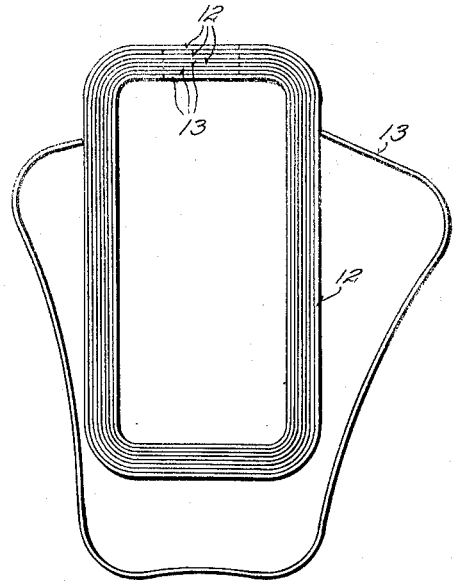
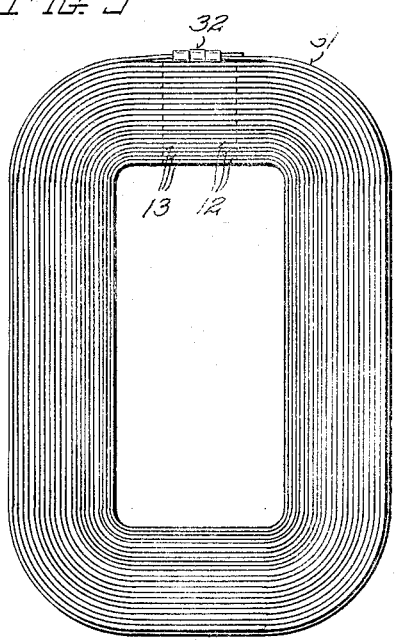
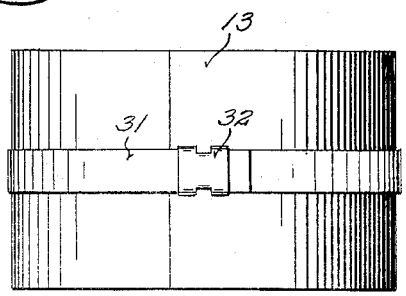
INVENTOR.
Edwin A. Link
BY
Attorney

United States Patent Office 2,927,366
Patented Mar. 8, 1960

2,927,366

METHOD OF MAKING MAGNETIC CORES

Edwin A. Link, Waukesha, Wis., assignor to R T & E Corporation, Waukesha, Wis., a corporation of Wisconsin Application May 21, 1956, Serial No. 586,128

10 Claims. (Cl. 29—155.57)

This invention relates to a new and improved laminated hollow magnetic core adapted for use in transformers and other electrical apparatus. The invention further relates to the method of making the improved core.

While various attempts have been made to produce a laminated hollow magnetic core by winding a continuous strip of flat magnetic sheet material on a mandrel to form a spiral coil and forming individual loops for the core by means of a transversely disposed cut, the results have not proved entirely satisfactory. A typical example of this method of forming a magnetic core is illustrated in the U.S. Letters Patent No. 1,935,426 issued to Harry M. Acly on November 14, 1933.

In actual practice, a magnetic core constructed in accordance with the teachings of the above-mentioned Acly patent has not proved satisfactory and, to the best of my knowledge, no one in the industry has followed its teachings.

The inherent irregularities in contour produced during the process of winding the initially formed spiral coil, increase with the number of turns in the core with the result that the alternate loops of the reassembled core which are reversed during the process of reassembling fail to provide full surface contact with the surfaces of the adjacent loops of the reassembled core. The required reversal of the successive loops combined with the inherent irregularities caused, in part, by the varying thickness of the running strip and varying contour of the wound core results in the widening of the gap between the ends of each successive loop as the loops of the core are reassembled to form the finished core. The resultant core, due to these irregularities between surfaces of the adjacent reversed turns of the core, frequently has excessive air gaps in one part or another and thus does not develop the full magnetic properties of the material and does not give the desired optimum operating characteristics for the finished core.

Manufacturing requirements of the industry demand close performance tolerances which are not available in a device constructed in accordance with the teachings of the above discussed Acly patent.

The primary object of the present invention reisdes in the provision of a new and improved hollow laminated wound magnetic core which overcomes the inherent shortcomings of cores previously formed by the spiral winding of a single strip of material.

Another object of the present invention resides in the provision of a new and improved hollow wound laminated magnetic core formed of a plurality of separate strips of magnetic material.

Another object of the present invention resides in the new and improved method and means whereby the operating characteristics of random finished cores may be maintained substantially uniform. This desired uniformity in operating characteristics of random cores may be controlled by the selection and use of a plurality of separate strips of material having different watt-loss characteristics so that the resultant watt-loss characteristic of random cores may be maintained substantially constant.

Another object of the present invention resides in the new and improved method of forming the hollow laminated wound magnetic core using a plurality of strips of material which are simultaneously flat wound in spiral form to provide successive loops of the finished core.

Another object of the present invention resides in the provision of a new and improved method of producing a hollow laminated wound magnetic core formed of a plurality of strips of material which are simultaneously flat wound on a rotating mandrel into desired size and form. The initially formed core is then unwound into a relatively large loop of polygonal form to facilitate the separation of the core into its separate component strips. The separate component strips are then rewound into their initially formed spiral shape, after which one side of each of the spirally wound loops is cut transversely to provide individual loops of each of the successive turns of the spirally wound strips. The initially formed core is then reassembled by replacing the successive turns of each loop in the identical position and relationship which it had in the initially formed hollow laminated wound magnetic core.

Another object of the present invention resides in the provision of an indexing means in the initially formed hollow laminated wound magnetic core to facilitate the positioning of the transverse cut in the separate spirally wound loops and also to facilitate the reassembly of the finished core.

Another object of the present invention resides in the staggering of the position of the transverse cut in the separate spirally wound loops formed by the plurality of strips so that the juncture formed by the end-to-end contact between the successive turns of one loop and the end-to-end contact between the successive turns of the adjacent loops are in staggered relationship when the several turns of the several loops are reassembled in the identical relationship in which they were initially wound.

Another object of the present invention resides in the provision of tensioning means, surrounding the finished core, operative to maintain a butting end-to-end contact between the adjacent ends of each successive loop of the core in its reassembled form.

Other objects and advantages will appear from the following description of an illustrative embodiment of the present invention.

In the drawings:

Figure 1 is a schematic side elevational view of a form of apparatus which may be used in connection with the production of a hollow laminated core, constructed in accordance with the teachings of the present invention, and comprising a plurality of separate strips of magnetic material which are superimposed and simultaneously wound in flat condition into a spiral form on a rotatable mandrel;

Fig. 2 is a front elevational view of the spirally wound core formed by the superimposed flat winding of a plurality of strips of magnetic material upon a core or mandrel;

Fig. 3 is a top plan view of the initially wound core provided with an indexing means or hole adapted to facilitate the subsequent coil forming operations;

Fig. 4 is a front elevational view of one of the strips of magnetic material, rewound into its initially formed spiral shape, after being separated from the remaining component strip or strips of the initially wound core;

Fig. 5 is a view similar to Fig. 4 showing another component strip of the initially formed core after it has been separated from the remaining component strip or strips of the wound core, and rewound to its initially formed spiral shape;

Fig. 6 is a fragmentary front elevational view of the spirally wound strip of magnetic material shown in Fig. 4 with a pin inserted in the indexing hole for retaining the several turns of the spirally formed strip in surface contact and fixed relationship with each other, and a transverse cut disposed in laterally spaced relationship with the indexing pin to sever the several spiral turns of the wound strip into individual loops;

Fig. 7 is a view similiar to Fig. 6 showing another component strip of the initially wound core showing an indexing pin for retaining the several turns of the spirally wound strip in surface contact and fixed relationship with each other, and the transverse cut disposed either to the side opposite that in which the cut was made in the other component strip or at a distance from the indexing pin which is different from that of the cut in the component strip to provide a staggered relationship between the cuts formed in successive loops of the initial spirally wound core;

Fig. 8 is a front elevational view of a partially reassembled core showing the application of successive loops of the initially wound core applied to each other in the identical relationship which they assumed in the initial spirally wound core begining with the smallest loop and ending with the largest loop;

Fig. 9 is a front elevational view of the completely reassembled core provided with a tensioning means adapted to draw the successive turns of the reassembled core into surface contact with each other and the adjacent ends of each loop into abutting relationship with each other; and Fig. 10 is a top plan view of the finished core showing the tensioning means for retaining the several loops of the core in fixed relationship.

Before entering into a detailed description of the new and improved hollow laminated wound magnetic core and the method of making the same embodied in the present invention, it is believed that a brief description of the raw material utilized in connection with the production of wound magnetic cores will facilitate better understanding of both the invention and the improved results obtained by its practice.

In the purchase of desired raw material in the form of large rolls of strip material from the steel mill, the manufacturer is required to accept rolls of sheet material in which the watt-loss characteristic of individual rolls varies within specified limits. If these rolls are used individually in the formation of separate magnetic cores, the resultant characteristics of the several cores will vary in accordance with the watt-loss rating of the coil from which each was formed.

The new and improved method of forming hollow laminated wound magnetic cores, in accordance with the teachings of the present invention, makes it possible to form the individual magnetic cores by selecting and combining the use of individual rolls of steel strips having different watt-loss characteristics so that the watt-loss characteristic of the several cores, each of which is formed by a plurality of individual strips, will be substantially uniform.

To the best of applicant's knowledge and belief, he is the first to form a hollow magnetic core from a plurality of strips of magnetic material which are wound to form a core of desired size and shape and in which the formed core is unwound into separate loops of the several original strips after whcih the individual rewound loops are severed by a transverse cut and the individual turns of each loop are reassembled in the identical arrangement and relationship which they assumed in the initialy formed core.

Figure 1 of the accompanying drawings affords an illustration of one form of apparatus on which the magnetic core of the present invention may be wound. The illustrated apparatus includes a vertically disposed power driven disc adapted for rotation in a counter-clockwise direction. A core block or mandrel 11 is adapted to be releasably secured at the center of the disc 10. The block 11 on which the magnetic core is wound is substantially rectangular in form to delineate the central opening of the finished core.

Referring more particularly to Figure 2 of the accompanying drawings, it will be noted that the core block 11 has a width W at one of its ends and a width W plus C at its other end wherein C is equal to the width of a transverse cut which is subsequently made in the successive turns of spirally wound strips 12 and 13 formed of magnetic material. The strip 12 of magnetic material is supported on a reel 14 which includes a shaft 15 journalled for free rotation in bearings 16 formed in pillow blocks positioned adjacent the upper extremity of a pedestal or mounting bracket 17. The strip 13 is similarly mounted on a reel 18 rotatably supported in a mounting bracket 19 disposed in line with the mounting bracket 17. The reels 14 and 18 are so positioned that the strips 12 and 13 become superimposed upon each other as they are wound onto the core block 11. In the present instance, I have chosen to illustrate a plurality of guide rollers 20 adapted to function in a manner which will prevent interference between the strips 12 and 13 as they are payed out from the reels 14 and 18. In directing the strips 12 and 13 from the reels 14 and 18 to the core block 11, they are passed between pairs of spring urged friction blocks 21 which are slidably mounted in a suitable frame or yoke 22 positoned adjacent the periphery of the disc 10. The friction blocks 21 serve to maintain the portions of the strips 12 and 13 which lie between them and the core block 11 under suitable tension. The free ends of the strips 12 and 13 are inserted in a groove 23 disposed transversely of the core block 11. The groove 23 serves to releasably retain the free ends of the strips 12 and 13 in the core block 11.

Suitable means is provided for applying pressure on the upper surface of the superimposed strips 12 and 13 as they are wound onto the rotating core block 11. This pressure means includes a flat roller 24 having length substantially equal to the width of the superimposed strips 12 and 13. The roller 24 is journalled for free rotation in one end of an arm 25 provided with a leg 26 which is rockably mounted on a fixed shaft 27. Any suitable pressure means, such as a pneumatic or hydraulic cylinder and piston 28 is operatively connected to the arm 25 to maintain the roller 24 in constant pressure contact with the superimposed strips 12 and 13 as they are wound onto the core block 11.

After the free ends of the superimposed strips 12 and 13 have been inserted and secured in the groove 23 of the core block 11 power may be applied to rotate the disc 10 in a counterclockwise direction to effect the spiral winding of the superimposed strips 12 and 13 on the core block 11.

Suitable counter means (not illustrated) may be operatively associated with the power driven disc 10 to provide a visible means for indicating the number of turns of the strips 12 and 13 which are applied to the core block 11.

Obviously, the shape of the core is predicated upon the selected core block 11 and the size of the successive cores may be maintained substantially uniform by applying the same number of turns of the strip material to the coil block 11. The width of the core is determined by the width of the strips 12 and 13.

After the initial winding of the core is completed it is annealed.

An indexing control is utilized to facilitate the subsequent reassembling of the core in finished form. In the present instance, an indexing hole 29 is drilled through the several laminations at one end of the core. To further facilitate the reassembling of the subsequently formed separate loops of the core, one of the laminated faces of the core is marked in any suitable manner such as by the application of a chalk mark or stripe of paint to assure the reassembly of the several loops of the core in the identical relationship which they assumed in the initial winding of the core.

After the initially wound core has been provided with the indexing hole 29 and an identifying means applied to one of the laminated faces of the core, the several component strips of the core are separated from each other. Any appropriate means may be utilized for effecting the desired separation of the component strips of the initially wound core. One means which has been successfully employed in this step in the process of producing the core has been to place one of the laminated sides of the core on a flat surface, apply a clip to the ends of the several component strips of the core, unwind the last several turns of the initially formed core to provide a relatively large polygonal loop, reclip the free ends of the several laminated strips to the unwound portion of the strips to maintain the polygonal loop in proper form and then continue the opening of the initially formed core until the same is completely unwound. Care should be taken as to the size of the polygonal loop to insure against bending the strips beyond their elastic limit.

After the initially formed core has been completely unwound, its several component strips are individually rewound to the form which they assumed in the initial winding of the core. An indexing pin 30 is then inserted into the aligned indexing holes 29 formed in the several spiral turns of each strip. After the indexing pin has been applied to each of the rewound component strips of the core, a clamping means is applied to retain the several turns of the strip in surface contact with the next adjacent turn of the spirally wound strip. A cut C is then made transversely of the spirally wound strip to sever the same into individual loops. Any appropriate means may be utilized for effecting the cutting of the several spirally wound component strips of the initially formed core. In practice, I have found that the operation may be expeditiously effected by the use of a high speed abrasive wheel which is bathed with a coolant. After the transverse cut C has been made in each of the spirally wound component strips of the initially formed core, the several individual loops of the component strips of the core are ready for reassembly.

The operation of reassembling the core is facilitated by the positioning of the several component strips of the initially wound core within convenient reach of the assembler, care being taken to have the identifying marks or painted stripes visible to the assembler to insure the fact that the several loops of the component strips of the core are reassembled in the identical relationship which they bore at the time the core was initially wound.

The reassembly of the core is begun by taking the smallest loop and removing it from its innermost position in the series of loops which make up one of the component strips of the initially wound core. The severed ends of this loop are spread to permit its slidable positioning over the end of the mandrel. The innermost or smallest loop of the next adjacent series of loops which make up the adjacent component strip is then applied to the initially positioned loop on the mandrel by spreading its severed ends a sufficient distance to permit its being slid into proper position on the previously applied loop. The inherent resilience of each loop will cause it to return to a substantially closed position after its free ends have traversed the length of the previously applied loop. This process is continued by the application of successive loops in the same sequential order as in their initial formation. From time to time during the reassembling of the core it may be desired to utilize the blows of a soft hammer to maintain the laminated surface of the core substantially smooth and jar the assembled loops sufficiently to bring their severed ends into substantially abutting relationship.

After all of the loops of the initially wound core have been reassembled, a tensioning member in the form of a binding strap 31 is applied to the peripheral surface of the core. The binding strap is drawn tightly around the core and tension is maintained on the strap while sharp, soft hammer blows are struck against the outer surface of the core to assure the abutting relationship between the adjacent ends of each of the individual loops of the core. When the tensioning operation of the binding strap is completed an anchoring clip 32 is applied to the strap and crimped in the usual manner to retain the strap 31 tightly around the reassembled core.

From the foregoing detailed description of an illustrative embodiment of the present invention, it will be noted that a new and improved hollow wound laminated magnetic core has been provided. The core and method of making the same disclosed herein embodies several new and improved features which combine in a novel manner to produce a light and compact core having low loss, low exciting current, permanent characteristics, one which is relatively inexpensive to manufacture, and easy to reassemble by reason of the fact that it comprises a plurality of single-turn loops of laminations provided with staggered butt joints which permit its easy disassembly or reassembly without requiring the use of special tools.

The construction of the hollow laminated magnetic core of the present invention provides one in which joint bulges and gap growth are eliminated to thereby improve its operating and performance characteristics.

One of the salient features of the present invention resides in the simultaneous spiral winding of superimposed strips of grain orientated cold-reduced strips of material.

Another important feature of the present invention resides in the separation of the component strips of the initial spirally wound core followed by the severing of the successive spirally wound turns to form individual single-turn loops which are adapted for reassembly in the identical relationship that they bore in the initially wound core.

While the invention has been described in considerable detail in the foregoing specification, it is to be understood that various changes may be made in its embodiment without departing from or sacrificing any of the advantages hereinafter claimed.

I claim:

1. The process of forming a laminated magnetic core having successive loops of strips of magnetic material, said process comprising the steps of the simultaneous flat winding of a plurality of separate superimposed strips of magnetic material to initially form the core, providing indexing means on the several turns of the superimposed strips of the core, separating the initially formed core into its component coils, forming a transverse cut through the several turns of each coil to form separate loops for the core, the transverse cuts of each coil being disposed in offset relationship with respect to the cut of another coil, and reassembling the individual loops of the several component coils in the identical positions that they assumed with respect to each other in their original wound form with the ends of each loop in abutting relationship so that the transverse cuts of the successive loops of the core are staggered with relation to those formed in the adjacent loops of the core.

2. The process of forming a laminated magnetic core having successive loops of strips of magnetic material, said process comprising the steps of the simultaneous flat winding of a plurality of separate superimposed strips of magnetic material to initially form the core, providing indexing means on the several turns of the superimposed strips of the core separating the initially formed core into its component coils, forming a transverse cut through the several turns of each coil to form separate loops for the core, the transverse cuts of each coil being disposed in offset relationship with respect to the cut of another coil, reassembling the individual loops of the several component coils in the identical positions that they assumed with respect to each other in their original wound form with the ends of each loop in abutting relationship so that the transverse cuts of the successive loops of the core are staggered with relation to those formed in the adjacent loops of the core, and applying a tensioning member circumferentially of the reassembled core to bring the adjacent faces of the transverse cut of each individual loop of the core into abutting relationship with each other.

3. The process of forming a hollow magnetic core including a plurality of separate strips of magnetic material, said process comprising the simultaneous flat winding of the plurality of strips in superimposed relationship to form a core, providing indexing means on the several turns of the superimposed strips of the core separating the initially formed core into its components coils, forming a transverse cut in each of the coils to produce a plurality of individual loops from each of the spirally wound coils, the transverse cut in each of said coils being offset with respect to the cut in another coil, and reassembling the individual loops of the core beginning with the smallest one and ending with the largest one so that the reassembled individual loops of the core assume the identical positions they had with respect to each other in the originally formed core with the ends of each loop in abutting relationship and with the transverse cuts of successive loops being disposed in staggered relationship with those of the next adjacent loops of the core.

4. The process of forming a hollow magnetic core including a plurality of separate strips of magnetic material, said process comprising the simultaneous flat winding of the plurality of strips in superimposed relationship to form a core, providing indexing means on the several turns of the superimposed strips of core, separating the initially formed core into its component coils, forming a transverse cut in each of the coils to produce a plurality of individual loops from each of the spirally wound coils, the transverse cut in each of said coils being offset with respect to the cut in another coil, reassembling the individual loops of the core beginning with the smallest one and ending with the largest one so that the reassembled individual loops of the core assume the identical positions they had with respect to each other in the originally formed core with the ends of each loop in abutting relationship and with the transverse cuts of successive loops being disposed in staggered relationship with those of the next adjacent loops of the core, and applying a tensioning member around the peripheral surface of the reassembled core to draw one face of the transverse cut of each loop of the core into abutting relationship with the other face thereof.

5. The process of forming a hollow magnetic core including a plurality of separate strips of magnetic material, said process comprising the simultaneous flat winding of the plurality of strips in superimposed relationship to form a core, providing indexing means through the several turns in one side of the spirally wound core, separating the initially formed core into its component coils by unwinding the same, rewinding each of the component coils separately to return them to their original wound form, forming a transverse cut in each of the rewound coils to produce a plurality of individual loops from each of the spirally wound coils, the transverse cut in each of said rewound coils being offset of said indexing means with respect to the cut in another rewound coil, and reassembling the individual loops of the core beginning with the smallest one and ending with the largest one so that the reassembled individual loops of the core assume the identical positions they had with respect to each other in the originally formed core with the ends of each loop in abutting relationship and with the transverse cuts of successive loops being disposed in staggered relationship with those of the next adjacent loops of the core.

6. The process of forming a hollow magnetic core including a plurality of separate strips of magnetic material, said process comprising the simultaneous flat winding of the plurality of strips in superimposed relationship to form a core, providing indexing means through the several turns in one side of the spirally wound core, separating the initially formed core into its component coils by unwinding the same, rewinding each of the component coils separately to return them to their original wound form, forming a transverse cut in each of the rewound coils to produce a plurality of individual loops from each of the spirally wound coils, the transverse cut in each of said rewound coils being offset of said indexing means with respect to the cut in another rewound coil, reassembling the individual loops of the core beginning with the smallest one and ending with the largest one so that the reassembled individual loops of the core assume the identical positions they had with respect to each other in the originally formed core with the ends of each loop in abutting relationship and with the transverse cuts of successive loops being disposed in staggered relationship with those of the next adjacent loops of the core, and applying a tensioning member around the peripheral surface of the reassembled core to draw one face of the transerve cut of each loop of the core into abutting relationship with the other face thereof.

7. The process of forming a laminated hollow magnetic core having successive loops of strips of magnetic material, said process comprising the simultaneous spiral flat winding of a plurality of separate strips of magnetic material on a form having two sides of substantially equal length and one of the remaining two sides being slightly longer than the other side, providing indexing means on the several turns of the superimposed strips of the core, separating the initially formed core into its component coils by unwinding the same, rewinding each of the component coils separately into their original spiral core forming shape, forming a transverse cut across the longer of the unequal pair of sides of the rewound coils of the core to divide each of said rewound coils into a plurality of separate loops for the core, the position of the transverse cut of one rewound coil being offset with respect to the position of the transverse cut in another of said rewound coils, and reassembling the individual loops beginning with the smallest and ending with the largest to reform the laminated hollow magnetic core in which the reassembled individual loops of said core assume the identical position which they had with respect to each other in the originally formed core with the ends of each loop in abutting relationship and with the transverse cuts of the successive loops of the core being disposed in offset relationship with respect to those of the next adjacent loops of the core.

8. The process of forming a laminated hollow magnetic core having successive loops of strips of magnetic material, said process comprising the simultaneous spiral flat winding of a plurality of separate strips of magnetic material on a form having two sides of substantially equal length and one of the remaining two sides being slightly longer than the other side, providing indexing means on the several turns of the superimposed strips of the core, separating the initially formed core into its component coils by unwinding the same, rewinding each of the component coils separately into their original spiral core forming shape, forming a transverse cut across the longer of the unequal pair of sides of the rewound coils of the core to divide each of said rewound coils into a plurality of separate loops for the core, the position of the transverse cut of one rewound coil being offset with respect to the position of the transverse cut in another of said rewound coils, reassembling the individual loops beginning with the smallest and ending with the largest to reform the laminated hollow magnetic core in which the reassembled individual loops of said core assume the identical position which they had with respect to each other in the originally formed core with the ends of each loop in abutting relationship and with the transverse cuts of the successive loops of the core being disposed in offset relationship with respect to those of the next adjacent loops of the core, and applying a tensioning member around the outer surface of the reassembled core to draw the adjacent surfaces of the transverse cut of each loop of the core into abutting relationship.

9. The process of forming a laminated hollow magnetic core having successive loops of strips of magnetic material, said process comprising the simultaneous spiral flat winding of a plurality of separate strips of magnetic material on a form having two sides of substantially equal length and one of the remaining two sides being slightly longer than the other side, providing indexing means through the several turns in one side of said spirally wound core, separating the initially formed core into its component coils by unwinding the same, rewinding each of the component coils separately into their original spiral core forming shape, forming a transverse cut across the longer of the unequal pair of sides of the rewound coils of the core to divide each of said rewound coils into a plurality of separate loops for the core, said cut being substantially equal to the difference in length between the unequal pair of sides, the position of the transverse cut of one rewound coil being offset with respect to the position of the transverse cut in another of said rewound coils, and reassembling the individual loops beginning with the smallest and ending with the largest to reform the laminated hollow magnetic core in which the reassembled individual loops of said core assume the identical position which they had with respect to each other in the originally formed core with the ends of each loop in abutting relationship and with the transverse cuts of the successive loops of the core being disposed in offset relationship with respect to those of the next adjacent loops of the core.

10. The process of forming a laminated hollow magnetic core having successive loops of strips of magnetic material, said process comprising the simultaneous spiral flat winding of a plurality of separate strips of magnetic material on a form having two sides of substantially equal length and one of the remaining two sides being slightly longer than the other side, providing indexing means through the several turns in one side of said spirally wound core, separating the initially formed core into its component coils by unwinding the same, rewinding each of the component coils separately into their original spiral core forming shape, forming a transverse cut across the longer of the unequal pair of sides of the rewound coils of the core to divide each of said rewound coils into a plurality of separate loops for the core, said cut being substantially equal to the difference in length between the unequal pair of sides, the position of the transverse cut of one rewound coil being offset with respect to the position of the transverse cut in another of said rewound coils, reassembling the individual loops beginning with the smallest and ending with the largest to reform the laminated hollow magnetic core in which the reassembled individual loops of said core assume the identical position which they had with respect to each other in the originally formed core with the ends of each loop in abutting relationship and with the transverse cuts of the successive loops of the core being disposed in offset relationship with respect to those of the next adjacent loops of the core, and applying a tensioning member around the outer surface of the reassembled core to draw the adjacent surfaces of the transverse cut of each loop of the core into abutting relationship.

References Cited in the file of this patent

UNITED STATES PATENTS 2,467,868     Somerville _____ Apr. 19, 1949